United States Patent
Kosugi et al.

(10) Patent No.: US 7,508,610 B2
(45) Date of Patent: Mar. 24, 2009

(54) METHOD AND APPARATUS FOR RECORDING SERVO FRAME, STORAGE DISK, AND METHOD AND APPARATUS FOR OBTAINING SERVO FRAME INFORMATION

(75) Inventors: Tatsuhiko Kosugi, Kawasaki (JP); Yoshiyuki Kagami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 357 days.

(21) Appl. No.: 11/152,357

(22) Filed: Jun. 14, 2005

(65) Prior Publication Data

US 2006/0221479 A1 Oct. 5, 2006

(30) Foreign Application Priority Data

Mar. 30, 2005 (JP) ............................... 2005-098761

(51) Int. Cl.
*G11B 5/09* (2006.01)
(52) U.S. Cl. .......................................... 360/49; 360/48
(58) Field of Classification Search .................... None
See application file for complete search history.

(56) References Cited

U.S. PATENT DOCUMENTS

| | | | |
|---|---|---|---|
| 5,596,460 A | 1/1997 | Greenberg et al. | |
| 5,757,568 A * | 5/1998 | Greenberg et al. | ............ 360/49 |
| 5,798,885 A | 8/1998 | Saiki et al. | |
| 5,828,508 A | 10/1998 | Whaley et al. | |
| 5,856,798 A * | 1/1999 | Looykens et al. | ............. 341/94 |
| 6,016,547 A | 1/2000 | Ono | |
| 6,104,558 A | 8/2000 | Greenberg et al. | |
| 6,137,646 A | 10/2000 | Okamura et al. | |
| 2001/0013989 A1 | 8/2001 | Saiki et al. | |

FOREIGN PATENT DOCUMENTS

| | | |
|---|---|---|
| EP | 1 475 801 A1 | 11/2004 |
| JP | 7-334808 | 12/1995 |
| JP | 8-221892 | 8/1996 |
| WO | WO 96/20472 | 7/1996 |

* cited by examiner

*Primary Examiner*—Joseph H Feild
*Assistant Examiner*—Daniell L Negrón
(74) *Attorney, Agent, or Firm*—Greer, Burns & Crain, Ltd

(57) ABSTRACT

A servo-frame recording apparatus includes: a sector information rearranging section for rearranging serial bits of the sector information that is binary data; a first ExOR section for performing the ExOR (exclusive OR) on the sector information, the serial bits of which have been rearranged by said sector information rearranging section, and the track information, so that an exclusive logical sum is obtained; and a writing section for wiring the exclusive logical sum obtained by said ExOR section into the servo frame. With this configuration, a data length required for recording gray information and sector information can be shortened without lowering the reliability of a magnetic disk.

10 Claims, 15 Drawing Sheets

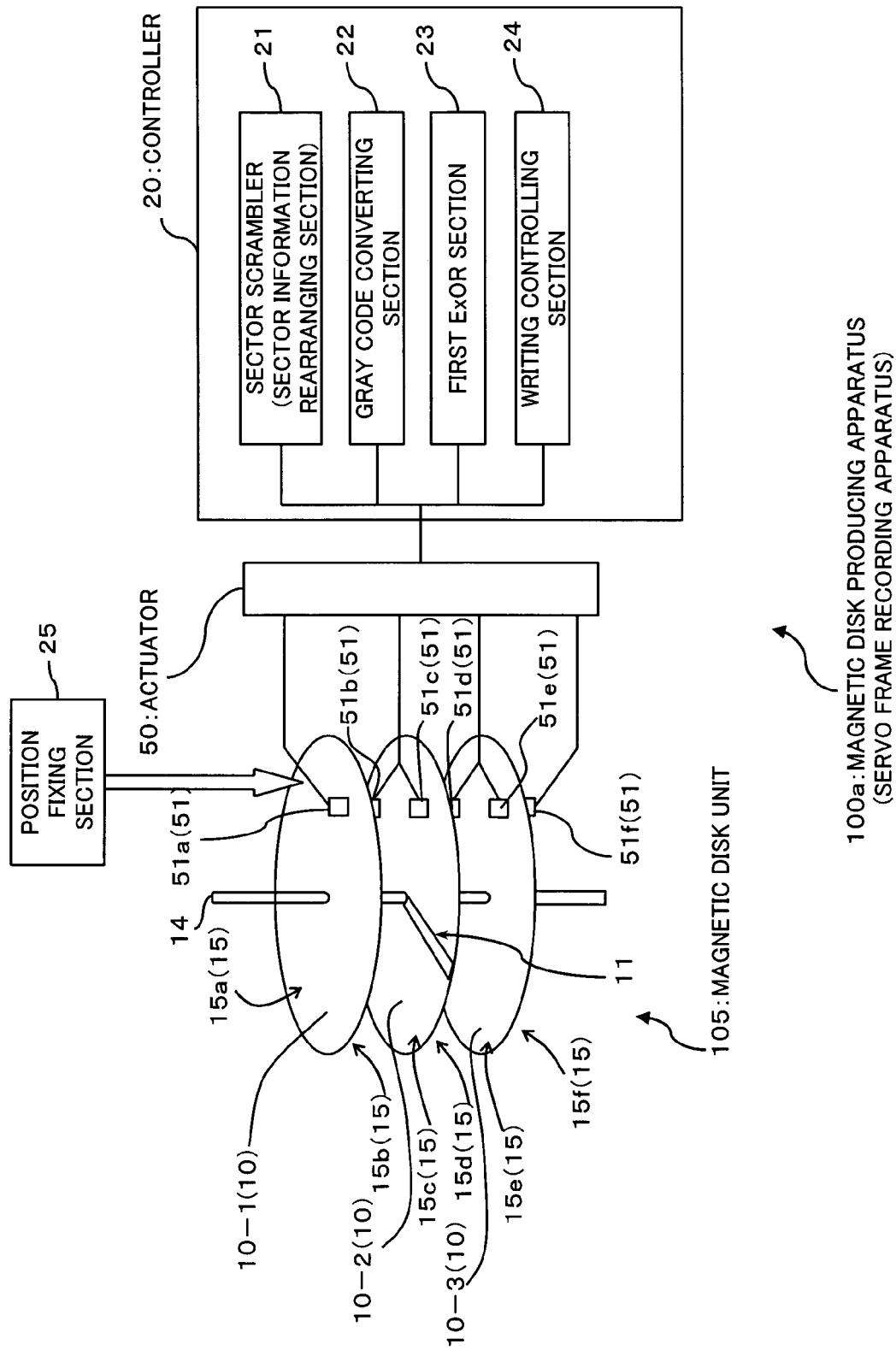

FIG. 8(a)

| CYLINDER NUMBER | SECTOR NUMBER | |
|---|---|---|
| | 00000000 (0) | 00000001 (1) |
| 00000000 (0) | 00000000 | 00000001 |
| 00000001 (1) | 00000001 | 00000000 |

NO DISTINCTION

FIG. 8(b)

| CYLINDER NUMBER | SECTOR NUMBER | |
|---|---|---|
| | 00000000 (0) | 10000000 (1) |
| 00000000 (0) | 00000000 | 10000000 |
| 00000001 (1) | 00000001 | 10000001 |

LARGE DIFFERENCE

FIG. 9

|  | (a) | (b) | (d) | (e) | (f) | (g) | (h) | (k) |
|---|---|---|---|---|---|---|---|---|
| EXAMPLE 1 | 17 | 1C | 34 | 14 | 28 | 34 | 1C | 17 |
| EXAMPLE 2 | 53 | 7A | 9E | 27 | E4 | 9E | 7A | 53 |

FIG. 14

|  | (a) | (b) | (c) | (d) | (e) | (f) | (g) | (h) | (j) | (k) |
|---|---|---|---|---|---|---|---|---|---|---|
| EXAMPLE 1 | 17 | 1C | 46 | 6E | 14 | 28 | 6E | 46 | 1C | 17 |
| EXAMPLE 2 | 53 | 7A | EC | 08 | 27 | E4 | 08 | EC | 7A | 53 |

110: MAGNETIC DISK

111

METHOD AND APPARATUS FOR RECORDING SERVO FRAME, STORAGE DISK, AND METHOD AND APPARATUS FOR OBTAINING SERVO FRAME INFORMATION

BACKGROUND OF THE INVENTION

1. Field of the Invention

The present invention relates to a technique to recode gray information and sector information into a servo frame region formed on a magnetic disk.

2. Description of the Related Art

Accompanying drawings FIGS. 15(a) and 15(b) illustrate a configuration of a conventional magnetic disk; FIG. 15(a) schematically illustrates a configuration of a conventional magnetic disk and FIG. 15(b) schematically shows a configuration of a servo frame formed on the magnetic disk of FIG. 15(a).

A conventional magnetic disk 110, as shown in FIG. 15(a), takes the form of a platter one side or the both sides of which serve recording layer covered with a magnetic material, and a non-illustrated magnetic head reads information from and write information into a surface (a storage region) of the magnetic disk 110.

On the magnetic disk 110, a number of servo frames 111 are radially formed so as to stretch from the center to the circumference at predetermined intervals. Information for specifying a magnetic head is recorded in a servo frame 111.

For example, each servo frame 111 of a conventional magnetic disk 110 retains a preamble, a servo mark, gray/sector information (head information), a position burst, a post code and other information.

An exemplary gray/sector information is 24 bit formed by 16-bit gray information and 8-bit sector information, and a servo frame 111 prepares a space for retaining such gray information and sector information therein.

Here, gray information is a gray code generated by logical conversion performed on binary data representing a cylinder number, and sector information is binary data representing a sector number.

A magnetic disk apparatus reads data from a magnetic disk 110 with reference to gray information and sector information recorded in a servo frame with the intention of preventing a servo-frame shift and/or a track shift, which may destroy user data, from occurring.

A data recoding density has been enhanced year by year and accordingly, a servo sample rate (a servo sample frequency) has been getting higher. A raise in a servo sample rate requires an increase in the number of servo frames 111 but such an increase problematically lowers a format efficiency of a magnetic disk 110.

For compatibility between an increase in the number of servo frames and the prevention of lowering in format efficiency of a magnetic disk 110, effective solutions are enhancement of a recording density (a bit density) into a servo frame 111 and reduction in a data amount to be recorded into a servo frame 111.

For example, Japanese Patent Application Laid-Open (KOKAI) No. HEI 8-221892 discloses a manner for saving a storage region space of a disk by coding a servo address so that lesser bits are used for storing the servo address.

On a magnetic disk 110, both of gray information and sector information have to be recorded into a servo frame 111 in order to inhibit a servo-frame shift and/or a track shift. A conventional magnetic disk 110 however requires a long bit length for recording such gray information and sector information, and the data length of a servo frame 111 problematically lengthens. That lowers a format efficiency.

SUMMARY OF THE INVENTION

With the foregoing problems in view, it is an object of the present invention to shorten the data length required for recording gray information and sector information by various schemes for a recording manner of the information without lowering reliability of a magnetic disk.

As a first generic feature, there is provided a method for recoding sector information and track information into a servo frame on a storage disk, comprising the steps of: (a) rearranging serial bits of the sector information that is binary data; (b) obtaining an exclusive logical sum of the sector information, the serial bits of which have been rearranged in the step (a) of rearranging, and the track information; and (c) writing the exclusive logical sum obtained in the step (b) of obtaining into the servo frame.

As a preferable feature, the method may further comprise the step of (d) rearranging serial bits of the track information that is binary data, and the step (b) of obtaining may obtain the exclusive logical sum using the sector information, the serial bits of which have been rearranged in the step (a) of rearranging, and the track information, the serial bits of which have been rearranged in the step (d) of rearranging.

As a second generic feature, there is provided an apparatus for recoding sector information and track information into a servo frame on a storage disk, comprising: a sector information rearranging section for rearranging serial bits of the sector information that is binary data; an ExOR section for performing an ExOR (exclusive OR) on the sector information, the serial bits of which have been rearranged by the sector information rearranging section, and the track information, so that an exclusive logical sum is obtained; and a writing section for wiring the exclusive logical sum obtained by the ExOR section into the servo frame.

As a preferable feature, the apparatus may further comprising a track information rearranging section for rearranging serial bits of the track information that is binary data, and the ExOR section may perform the ExOR on the sector information, the serial bits of which have been rearranged by the sector information rearranging section, and the track information, the serial bits of which have been rearranged by the track information rearranging section.

As a third generic feature, there is provided a storage disk on which sector information and track information is recorded into a servo frame formed on the disk, wherein an exclusive logical sum of the sector information that is serial binary data which has been rearranged and the track information is recorded in the servo frame.

As a preferable feature, the track information that is serial binary data may be rearranged and may recorded in the form of the exclusive logical sum obtained in conjunction with the sector information that has been rearranged into the servo frame.

As a fourth generic feature, there is provided a method for obtaining servo frame information serving as combined data generated by combining sector information and track information from a storage disk on which the combined data is recorded into a servo frame formed on the disk, comprising the steps of: (a) obtaining the combined data from the servo frame; (b) rearranging serial bits of the sector information that is binary data; and (c) performing an ExOR on the combined data obtained in the step (a) and the sector information, the serial bits of which have been rearranged in the step (b) of rearranging to generate the track data.

As a preferable feature, the method may further comprise the step of (d) rearranging serial bits of the track information that is binary data, which track information has been generated in the step (c) of performing, to restore the track information.

As a fifth generic feature, there is provided an apparatus for obtaining servo frame information serving as combined data generated by combining sector information and track information from a storage disk on which the combined data is recorded into a servo frame formed on the disk, comprising: a combined data obtaining section for obtaining the combined data from the servo frame; a sector information rearranging section for rearranging serial bits of the sector information that is binary data; and an ExOR section for performing an ExOR on the combined data obtained by the combined data obtaining section and the sector information, the serial bits of which have been rearranged by the sector information rearranging section, so that the track data is generated.

As a preferable feature, the apparatus may further comprise a track information restoring section for restoring the track information by rearranging serial bits of the track information that is binary data which track information has been obtained by the ExOR section.

The present invention guarantees the following advantages:

(1) The ExOR performed on sector information and track information generates an exclusive logical sum serving as combined data, which is to be recorded into a servo frame, can reduce the size of a storage region that the servo frame requires for retaining the sector information and the track information, so that the data length of the servo frame can be shortened and it is further possible to improve a format efficiency and an efficiency of a magnetic disk.

(2) Rearrangement of serial bits serving as sector information by the sector information rearranging section contributes to easy detection, as a seek error, of a shift in a servo frame number caused by an error whereby reliability of the magnetic disk can be improved.

(3) Scrambling track information can eliminate the possibility of occurrence of a reading error during a seeking operation.

Other objects and further features of the present invention will be apparent from the following detailed description when read in conjunction with the accompanying drawings.

BRIEF DESCRIPTION OF THE DRAWINGS

FIG. 1 is a block diagram showing a principle of the present invention and, more specifically, schematically showing a configuration of a magnetic disk producing apparatus (a servo frame recording apparatus) according to a first embodiment of the present invention;

FIGS. 8(a) and 8(b) are tables respectively showing, for comparison, combined data generated when rearrangement is performed and rearrangement is not performed on a sector number;

FIG. 9 is a table showing an example of digits generated in each of the procedural steps shown in the flow diagrams FIGS. 5 and 7;

FIG. 14 is a table showing an example of digits generated in each of the procedural steps shown in the flow diagrams FIGS. 12 and 13.

DESCRIPTION OF THE PREFERRED EMBODIMENTS

Various preferred embodiments of the present invention will now be described with reference to the accompanying drawings.

(A) First Embodiment

Figure 2A:
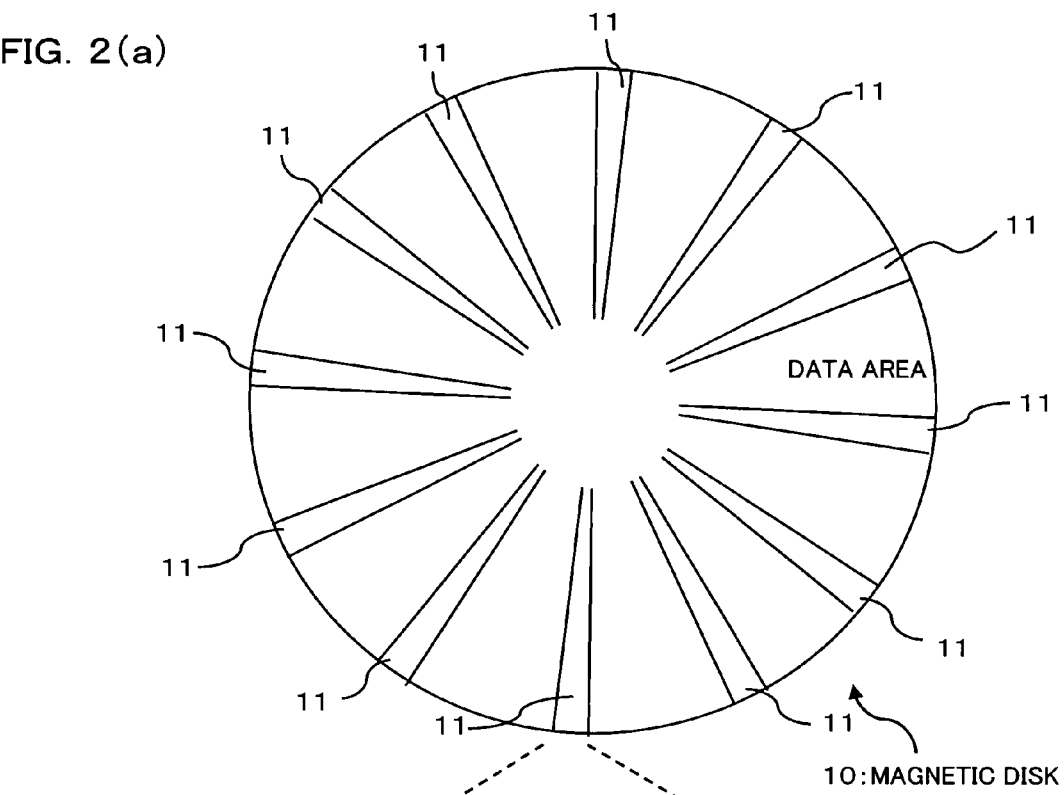
FIGS. 2(a) and 2(b) are diagrams showing a configuration of a magnetic disk produced by the magnetic disk producing apparatus of FIG. 1.
Figure 2B:
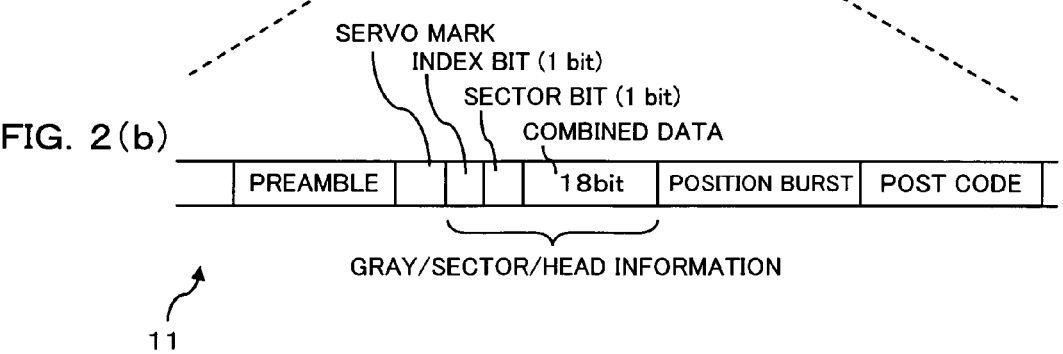
Figure 3:
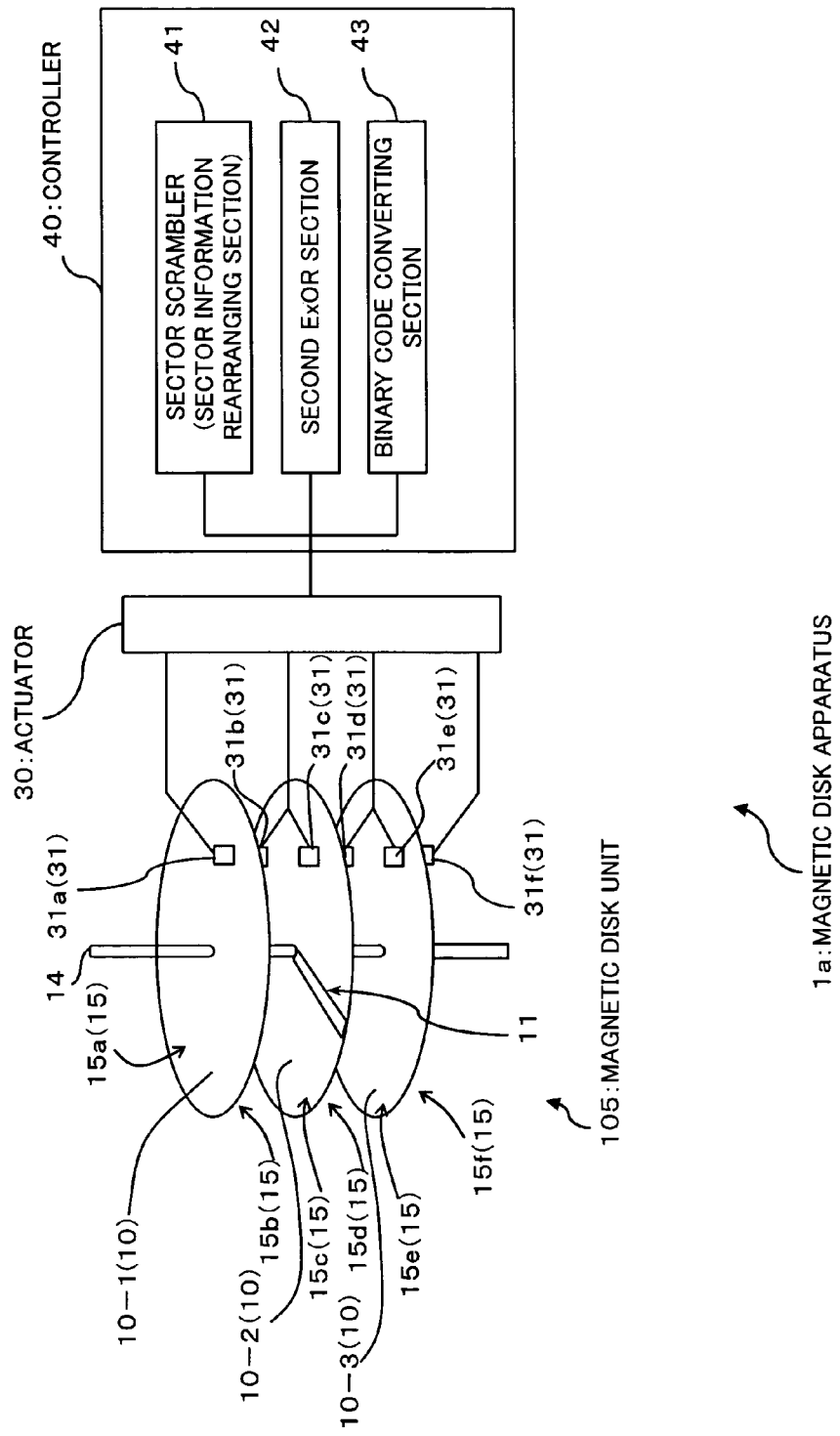
FIG. 3 is a block diagram schematically showing a magnetic disk unit including a magnetic disk of FIG. 2.

FIG. 1 is a block diagram schematically showing a configuration of a magnetic disk producing apparatus (a servo frame recording apparatus) according to the first embodiment of the present invention. FIGS. 2(a) and 2(b) are diagrams illustrating a configuration of a magnetic disk produced by the magnetic disk producing apparatus; more specifically, FIG. 2(a) schematically shows a configuration of a magnetic disk and FIG. 2(b) schematically shows a configuration of a servo frame formed on the magnetic disk. FIG. 3 is a block diagram schematically showing a configuration of a magnetic disk apparatus including the magnetic disk shown in FIGS. 2(a) and 2(b).

In the first embodiment, a magnetic disk producing apparatus 100a produces a magnetic disk unit 105 included in a magnetic disk apparatus 1a shown in FIG. 3. The magnetic disk unit 105 includes three magnetic disks 10-1, 10-2, 10-3 (see FIG. 2).

(A-1) Description of a Magnetic Disk

The magnetic disk unit 105, as shown in FIG. 1, includes three magnetic disks 10-1, 10-2, 10-3.

The centers (the centers of rotation) of the magnetic disks 10-1, 10-2, 10-3 are fixed to a spindle of a spindle motor (not shown) at predetermined intervals. Rotationally driving of the spindle motor rotates each of the magnetic disks 10-1, 10-2, 10-3 with the spindle as center. The magnetic disks 10-1, 10-2, 10-3 are substantially identical in configuration.

Hereinafter, a particular one of the magnetic disks is indicated by a reference number 10-1, 10-2 or 10-3 but an arbitrary magnetic disk is indicated by a reference number 10.

A magnetic disk 10 is a platter the both sides of which serve as recording layers covered with a magnetic material. Hereinafter, a circular surface of a magnetic disk 10 is called a storage region 15. In the illustrated example, the magnetic disk 10-1 includes storage regions 15a, 15b; the magnetic disk 10-2 includes storage regions 15c, 15d; and the magnetic disk 10-3 includes storage regions 15e, 15f.

Hereinafter, a particular one of a number of storage regions is specified by a reference number 15a, 15b, 15c, 15d, 15e or 15f, but an arbitrary storage region is indicated by a reference number 15.

Data recorded on a surface of a magnetic disk 10 (a storage region 15) is read by a magnetic head 31 of the magnetic disk apparatus 1a that is to be described later, which magnetic head 31 also writes data into the storage region 15.

As shown in FIG. 2(a), a number of servo frames 11 are discretely formed on a magnetic disk 10 at predetermined intervals in the circumferential direction. Each servo frame 11 retains various information pieces of a preamble, a servo mark, gray/sector/head information, a position burst, a post code and the like, as shown in FIG. 2(b).

In the first embodiment, gray/sector/head information of a servo frame retains an index bit, a sector bit and combined data as shown in FIG. 2(b).

An index bit is a part (in the illustrated example shown in FIG. 2(a), 1 bit) of an index pattern for specifying a storage region and a sector bit is a part (in the illustrated example of FIG. 2, also 1 bit) of a sector pattern. An index pattern is information to specify a storage region, and the magnetic disk apparatus 1a previously assigns an index pattern peculiar to each storage region 15.

A combination of such an index bit and a sector bit specifies a servo frame number that specifies a particular servo frame. One of the manners for specifying a storage region by using an index bit and a sector bit is disclosed in Japanese Patent Laid-Open (KOKAI) Publication No. 2004-335007.

Combined data is, as described later, an exclusive logical sum obtained by performing the ExOR (exclusive OR) on a servo frame number (a sector number, sector information) that is binary data serial bit of which has been rearranged (scrambled) in a predetermined method and serial bits of binary data obtained as a consequence of conversion of a cylinder number (track information) that is binary data into a gray code by a first ExOR section 23 included in a later-described magnetic disk producing apparatus 100a.

Servo frames 11 are formed on a magnetic disk 10 by the magnetic disk producing apparatus 100a.

(A-2) Description of a Magnetic Disk Producing Apparatus

The magnetic disk producing apparatus 100a, as shown in FIG. 1, includes a position fixing section 25, a controller 20, an actuator 50, and magnetic heads 51 (51a, 51b, 51c, 51d, 51e, 51f).

The position fixing section 25 determines a position at which a servo frame 11 is to be formed and fixes the position of the servo frame 11 by using a laser or the like.

Each of the magnetic heads 51 (51a, 51b, 51c, 51d, 51e, 51f) writes a servo frame 11 onto a magnetic disk 10. Under control of a writing controlling section 24 that is to be described later, a magnetic head 51 writes various information pieces (see FIG. 2(b)) constitute a servo frame 11 into a position on a storage region 15 of a magnetic disk 10 which position has been determined by the position fixing section 25. Each of the magnetic heads 51 (51a, 51b, 51c, 51d, 51e, 51f) is movable in the radial direction of a magnetic disk 10 in aid of the actuator 50.

In the first embodiment, the magnetic head 51a writes servo frames 11 into the storage region 15a. Similarly, the magnetic head 51b writes servo frames 11 into the storage region 15b; the magnetic head 51c, into the storage region 15c; the magnetic head 51d, into the storage region 15d; the magnetic head 51e, into the storage region 15e; and the magnetic head 51f, into the storage region 15f. Hereinafter, a particular magnetic head is specified by reference number 51a, 51b, 51c, 51d, 51e, or 51f, but an arbitrary magnetic disk is indicated by reference number 51.

Each magnetic head 51 serves as a writing section for writing combined data (to be detailed described later) generated by a first ExOR section 23 into a servo frame 11 formed on a magnetic disk 10.

The actuator 50 moves each magnetic head 51 in the radial direction of a magnetic disk 10, and includes a VCM (Voice Coil Motor; not shown) that is used for positioning the magnetic head 51.

The controller 20 controls various processes carried out in the magnetic disk producing apparatus 100a, such as a changeover of magnetic heads 51, positioning of a magnetic head 51 with respect to the magnetic disk 10, and writing of various data pieces (servo frame data) constituting a servo frame 11 by a magnetic head 51.

As shown in FIG. 1, the controller 20 serves to function as a sector scrambler (sector information rearranging section) 21, a gray code converting section 22, the first ExOR section 23 and a writing controlling section 24.

Functions of the controller 20 is realized by a processor or the like, which controls various processes performed in the magnetic disk producing apparatus 100a, executing programs previously recorded in a ROM or another storage.

Figure 4:
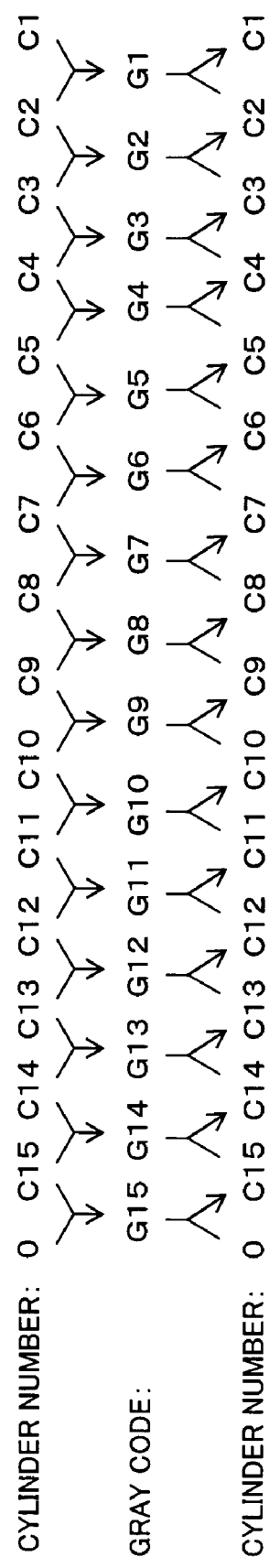
FIG. 4 is a diagram showing a concept of conversion performed between gray codes and binary data by a gray code converting section included in the magnetic disk producing apparatus of FIG. 1.

FIG. 4 explains the concept of conversion performed on binary data and a gray code genereted by a gray code converting section 22 of the magnetic disk producing apparatus 100a.

The gray code converting section 22 converts binary data into a gray code. In the magnetic disk producing apparatus 100a of the first embodiment, the gray code converting section 22 generates and converts (logically converts) into a gray code by performing the exclusive OR (ExOR) on a cylinder number as shown in FIG. 4.

For example, a cylinder number "15527 (3CA7h) is described in binary data "0011 1100 1010 0111", and the gray code converting section 22 logically converts the binary data to the following data:

0011 1100 1010 0111→0010 0010 1111 0100

The sector scrambler (sector information rearranging section) 21 rearranges (scrambles) serial bits of a STW sector number (sector information, a servo frame number). Here, a STW (Servo Track Writer) sector number is managed by a counter, which incrementally counts the number of servo frames 11 and which returns to 0 (zero), i.e., resets a count, when the count becomes the maximum servo numbers.

Assuming that a sector number and an exclusive logical sum are respectively 8-bit data, the sector scrambler 21 carries out rearrangement with eight inputs and eight outputs.

The sector scrambler is exemplified by a circuit that realizes the following determinant (1).

$$\begin{pmatrix} \text{output 7} \\ \cdots \\ \text{output 0} \end{pmatrix} = \begin{pmatrix} SCS(7)(7) & SCS(7)(6) & \cdots & SCS(7)(0) \\ SCS(6)(7) & \cdots & & \\ \cdots & \cdots & & \\ SCS(0)(7) & \cdots & & SCS(0)(0) \end{pmatrix} \begin{pmatrix} \text{input 7} \\ \cdots \\ \text{input 0} \end{pmatrix} \quad (1)$$

Multiplications and additions in the determinant (1) are computed, respectively regarded as logical products (AND) and logical sums (OR), so that the input serial bits are rearranged to convert into the output serial bits.

Further, the below determinant (2) is an example to realize the sector scrambler 21 of the magnetic disk producing apparatus 100a. The determinant (2) inverts input serial bits of a sector number.

$$\begin{pmatrix} \text{Bit 7} \\ \text{Bit 6} \\ \text{Bit 5} \\ \text{Bit 4} \\ \text{Bit 3} \\ \text{Bit 2} \\ \text{Bit 1} \\ \text{Bit 0} \end{pmatrix} = \begin{pmatrix} 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \end{pmatrix} \begin{pmatrix} S7 \\ S6 \\ S5 \\ S4 \\ S3 \\ S2 \\ S1 \\ S0 \end{pmatrix} \quad (2)$$

Thus scrambling a sector number contributes to detection of a seek error when a servo frame number shifts due to some error, because generated gray codes become irregular.

The sector scrambler 21 may be formed by an electronic circuit able to rearrange serial bits in the above manner or maybe realized by a processor executing a program arithmetic operation.

The first ExOR section (ExOR section) 23 performs the exclusive OR on the sector number the serial bits of which has been rearranged by the sector scrambler 21 and a gray code generated by conversion in the gray code converting section 22 to obtain the exclusive logical sum serving as combined data.

By way of example, assuming that a sector number after rearrangement by the sector scrambler 21 is "10000000" and a gray code generated by the gray code converting section 22 is "00000001", the first ExOR section 23 carries out the ExOR on the sector number "10000000" and the gray code "00000001" and obtains the exclusive logical sum "10000001" serving as combined data.

The writing controlling section 24 controls the magnetic head 51 to write the combined data generated by the first ExOR section 23 into a servo frame 11 formed on a magnetic disk 10.

Hereinafter description is made in conjunction with a succession of procedural steps (steps A10 to A60) of writing a sector number and a cylinder number into a servo frame 11 in the magnetic disk producing apparatus 100a according to the first embodiment with reference to flow diagram FIG. 5.

First of all, the magnetic disk producing apparatus 100a obtains a cylinder number (step A10), and the gray code converting section 22 converts the binary data of the cylinder number into a gray code (step A20). Further, the magnetic disk producing apparatus 100a obtains an STW sector number (step A30), and the sector scrambler 21 rearranges the serial bits of the sector number (step A40; a step of rearranging sector information).

The first ExOR section 23 performs the exclusive OR on the gray code and the rearranged sector number to obtain the exclusive logical sum of the code and the number (step A50; a step of the first ExOR), so that data (combined data) that is to be written into a servo frame is generated (step A60). The combined data is written into a servo frame 11 which has been formed on a magnetic disk 10 and the position of which is determined by the position fixing section 25 (a step of writing).

(A-3) Description of the Magnetic Disk Apparatus

The magnetic disk apparatus 1a includes a magnetic disk unit 105 having a number of magnetic disks 10 (in the illustrated example, three magnetic disks 10-1, 10-2, 10-3), produced by the magnetic disk producing apparatus 100a and selects an arbitrary one of the magnetic disks 10-1, 10-2, or 10-3 to write various data into and read various data from the selected magnetic disk.

For example, the magnetic disk apparatus 1a is used as a storage device for a computer system to send data read from a magnetic disk 10 to a computer and record data sent from the computer into a magnetic disk 10.

The magnetic disk apparatus 1a, as shown in FIG. 3, includes magnetic disks 10 (magnetic disk 10-1, 10-2, 10-3) magnetic heads (combined data obtaining sections) 31 (31a, 31b, 31c, 31d, 31e, 31f), an actuator 30 and a controller 40.

Each of the magnetic heads (combined data obtaining sections) 31 (31a, 31b, 31c, 31d, 31e, 31f) reads various data recorded on a corresponding magnetic disk 10 and write various data into the magnetic disk 10, and is movable in the radial direction of the magnetic disk 10 in aid of the actuator 30.

In the first embodiment, the magnetic head 31a writes data into and reads data from the storage region 15a. Similarly, the magnetic head 31b writes data into and reads data from the storage region 15b; the magnetic head 31c, into and from the storage region 15c; the magnetic head 31d, into and from the storage region 15d; the magnetic head 31e, into and from the storage region 15e; and the magnetic head 31f, into and from the storage region 15f. Hereinafter, one particular magnetic head is specified by a reference number 31a, 31b, 31c, 31d, 31e, or 31f, but an arbitrary magnetic head is indicated by a reference number 31.

In the magnetic disk apparatus 1a, each magnetic head 31 functions as a combined data obtaining section for obtaining combined data from a servo frame 11 formed on a magnetic disk 10.

The actuator 30 shifts the position of a magnetic head 31 in the radial direction of the magnetic disk 10, and includes a VCM (Voice Coil Motor; not shown) that is used for fixing the magnetic head 31 or the like.

The controller 40 controls various processes performed in the magnetic disk apparatus 1a, and for example controls a changeover of magnetic heads 31, positioning of a magnetic head 31 with respect to the magnetic disk 10, and writing/reading data by a magnetic head 31.

Specifically, the controller 40 controls the VCM to control determination of the position of a magnetic head 31, and controls a spindle motor (not shown) to control rotation of the magnetic disks 10. The controller 40 further controls data writing/reading that each magnetic head 31 performs by controlling an HDIC (a Head IC; not illustrated). The controller 40 carries out above controls in order to access a surface (a storage region 15) of a magnetic disk 10 by means of the magnetic head 31 associated with the magnetic disk for data writing and data reading.

In addition, the controller 40 functions as a sector scrambler (sector information rearranging section) 41, a binary code converting section 43, and a second ExOR section (ExOR section) 42, as shown in FIG. 3.

The sector scrambler (sector information rearranging section) 41 rearranges (scrambles) the serial bits of a sector number, similarly to the above-described sector scrambler 21 in the magnetic disk producing apparatus 100a, and for example, utilize the above determinant (1) to rearrange the serial bits of a sector number by performing the ExOR.

The sector scrambler 41 is identical or substantially identical in function and in configuration to the sector scrambler 21 included in the magnetic disk producing apparatus 100a, so repetitious description will be omitted here.

The binary code converting section 43 converts a gray code into binary data by, in the magnetic disk apparatus 1a of the first embodiment, performing the exclusive OR on the gray code and a cylinder number, as shown in FIG. 4.

The second ExOR section (ExOR section) 42 performs the ExOR on combined data obtained by a magnetic head 31 and sector information rearranged by the sector scrambler 41, and thereby obtains (generates, restores) a cylinder number (track information).

The above functions of the controller 40 are realized by, for example, a processor executing programs previously stored in a ROM or another storage which processor controls various processes performed in the magnetic disk apparatus 1a.

Figure 6:
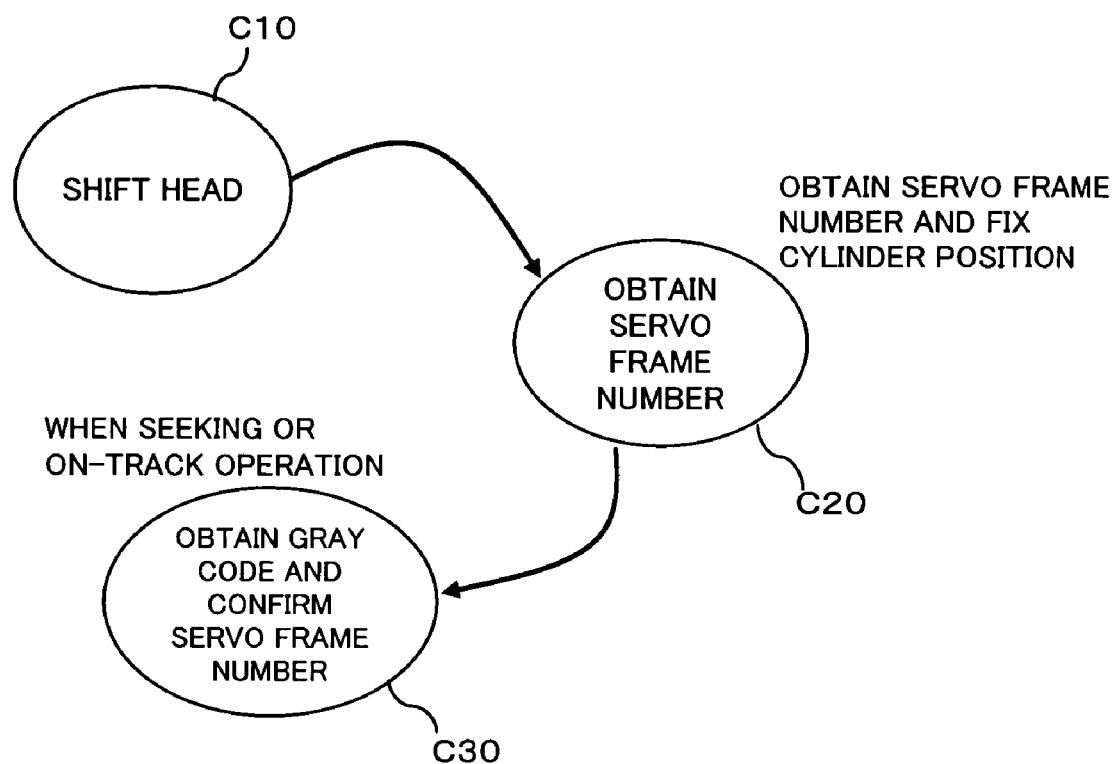
FIG. 6 is a flow diagram showing a state transition when a servo frame is about to be read by the magnetic disk apparatus according to the first embodiment.

Description will now be made in relation to a state transition when a servo frame 11 is read in the magnetic disk apparatus 1a having the above configuration according to the first embodiment with reference to flow diagram FIG. 6 (steps C10 to C30).

First of all, the magnetic disk producing apparatus causes the actuator 30 to shifts (sticks out) the magnetic head 51 onto the associated magnetic disk 10 in order to determine a position on the magnetic disk 10 (step C10). At that time, the position of the target servo frame is unknown, and the servo mark is accordingly not locked. Consequently, a servo frame number and a gray code that are associated with the target servo frame are also unknown.

Next, an index bit and a sector bit are read from the target servo frame to obtain a servo frame number (step C20). After sticking out the magnetic head 51, the position of the target servo frame is found at the time when a servo gate synchronizes with the magnetic disk 10, whereupon information in the target servo frame 11 is ready to be read.

After that, on the basis of the sector number read from the target servo frame, the gray code and servo frame number that have been unknown are confirmed (step C30).

Next, description will now be made in relation to a succession of procedural steps (steps B10 to B60) of reading a cylinder number from a servo frame 11 in the magnetic disk apparatus 1a with reference to flow diagram FIG. 7.

To begin with, the magnetic disk apparatus 1a reads combined data from a servo frame 11 (step B10; a step of obtaining combined data), and obtains an STW sector number (step B20), the serial bits of which is subsequently rearranged by the sector scrambler 41 (step B30; a step of rearranging sector information). The exclusive OR (ExOR) is performed on the combined data and the rearranged sector number by the second ExOR section 42 to generate (restore) an exclusive logical sum serving as a gray code (step B40; a step of performing the second ExOR).

After that, the binary code converting section 43 converts the gray code into binary data (step B50) and a cylinder number is thereby generated (step B60).

As mentioned above, in the magnetic disk producing apparatus 100a and the magnetic disk apparatus 1a of the first embodiment, since a sector number and a gray code generated as a consequence of a conversion carried out by the gray code converting section 22 are subjected to the ExOR to generate an exclusive logical sum serving as combined data, which is to be recorded into a servo frame 11, it is possible to reduce a storage size of a servo frame 11 for retaining the sector number and the gray code. As a result, the length of a servo frame 11 can be shortened and further it is possible to improve format efficiency and to use each magnetic disk 10 effectively.

Rearrangement (scrambling) on the serial bits of a sector number by the sector scrambler 21 contributes to easy detection of a seek error when a servo frame number shifts due to some error, because generated gray codes are irregular. Thereby, the magnetic disk producing apparatus 10a and the magnetic disk apparatus 1a obtain improved reliability.

FIGS. 8(a) and 8(b) compare combined data generated from a sector number the serial bits of which are not rearranged and combined data generated from a sector number the serial bits of which are rearranged; FIG. 8(a) shows combined data generated from a non-rearranged sector number, and FIG. 8(b) shows combined data generated from a rearranged sector number.

In FIGS. 8(a) and 8(b), each of sector numbers 0, 1 and cylinder number 0, 1 is assumed to be 8-bit binary data, from which combined data is generated. The serial bits of each sector number in the FIG. 8(b) are rearranged into the inverse order.

As shown in FIGS. 8(a) and 8(b), if a sector number or a cylinder number shifts by only one, the value of combined data generated from the sector number that has been rearranged is largely different from a right value. Whereby an error can be detected with ease, improving the reliability at the same time.

Figure 5:
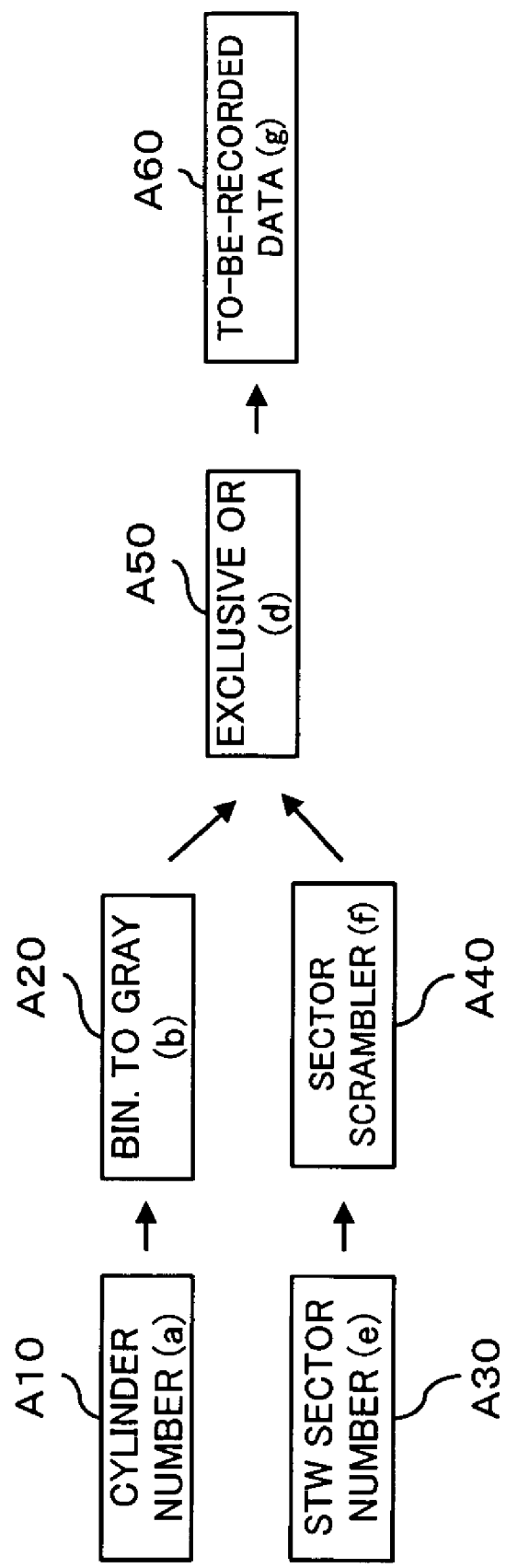
FIG. 5 is a flow diagram showing a succession of procedural steps of writing a sector number and a cylinder number into a servo frame by the magnetic disk producing apparatus of FIG. 1.
Figure 7:
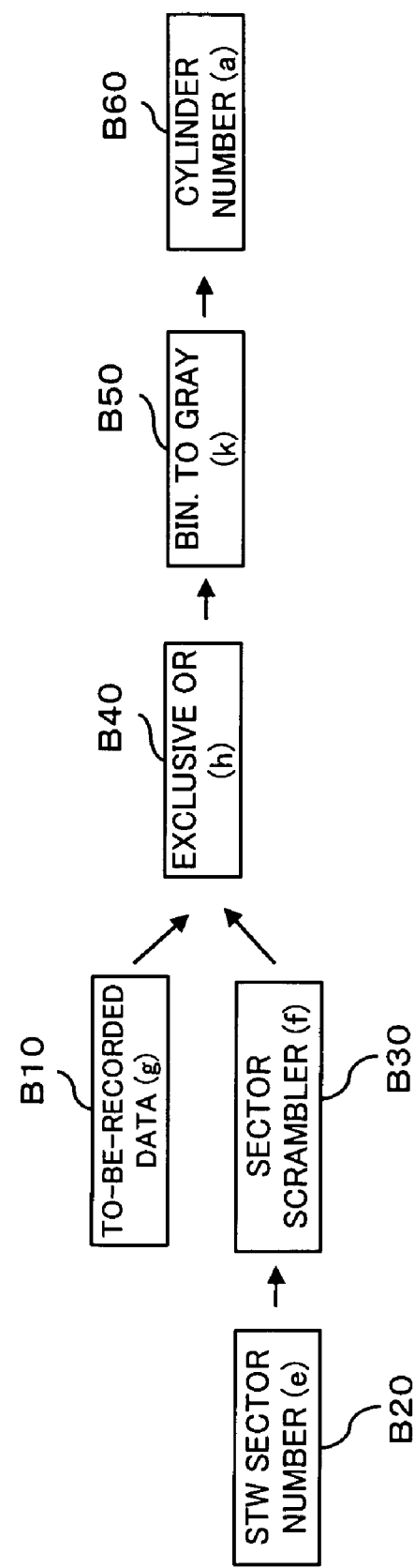
FIG. 7 is a flow diagram showing a succession of procedural steps of reading a cylinder number from a servo frame by the magnetic disk apparatus.

FIG. 9 shows examples of digits generated in steps of flow diagrams FIGS. 5 and 7. Symbols (a), (b), (c), (d), (e), (f), (g), (h), (k) in FIG. 9 respectively show hexadecimal digits generated in steps attaches symbols (a), (b), (c), (d), (e), (f), (g), (h), (k) in FIGS. 5 and 7.

(B) Second Embodiment

Figure 10:
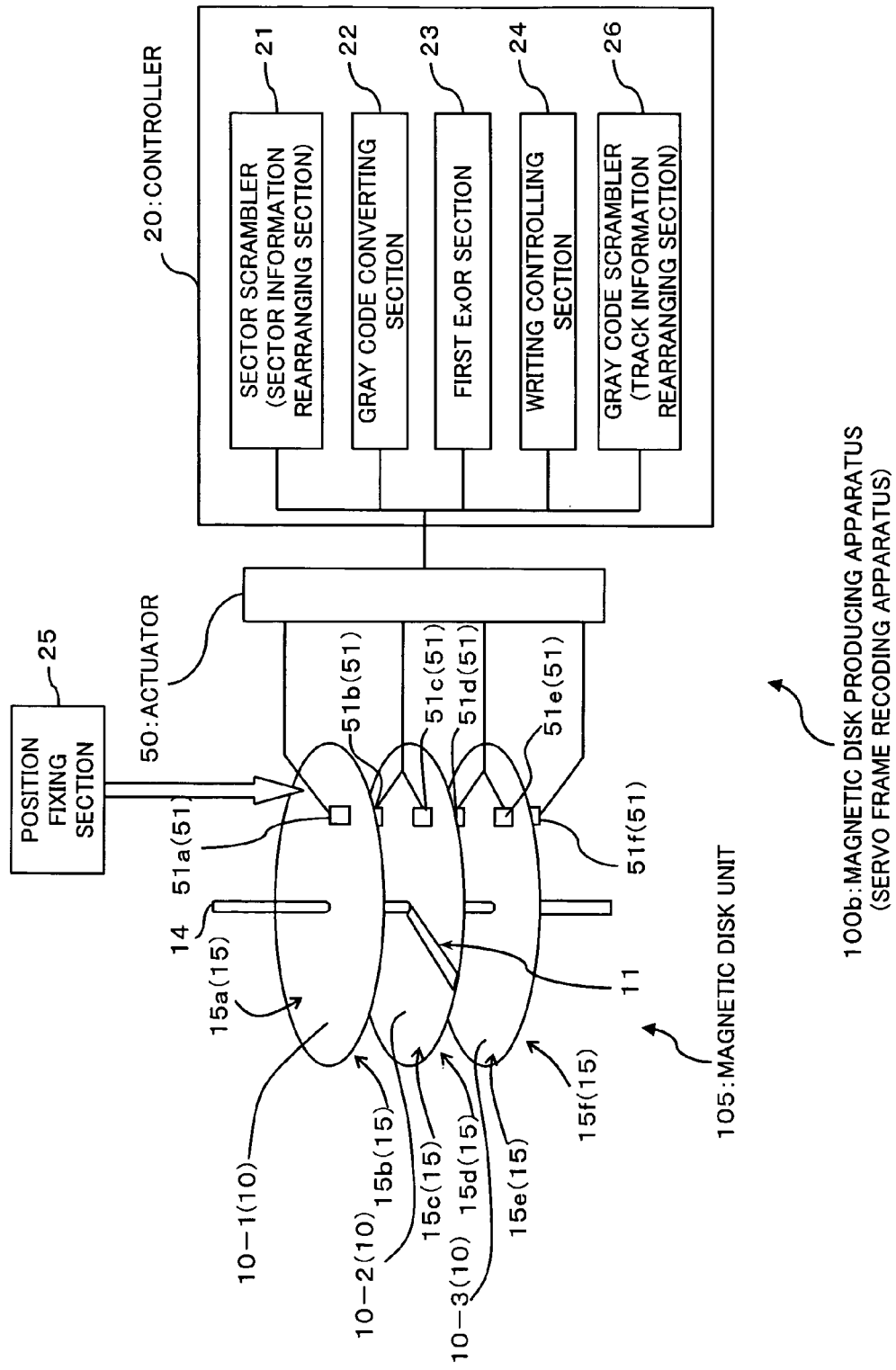
FIG. 10 is a block diagram schematically showing a configuration of a magnetic disk apparatus (a servo frame recording apparatus) according to a second embodiment of the present invention.
Figure 11:
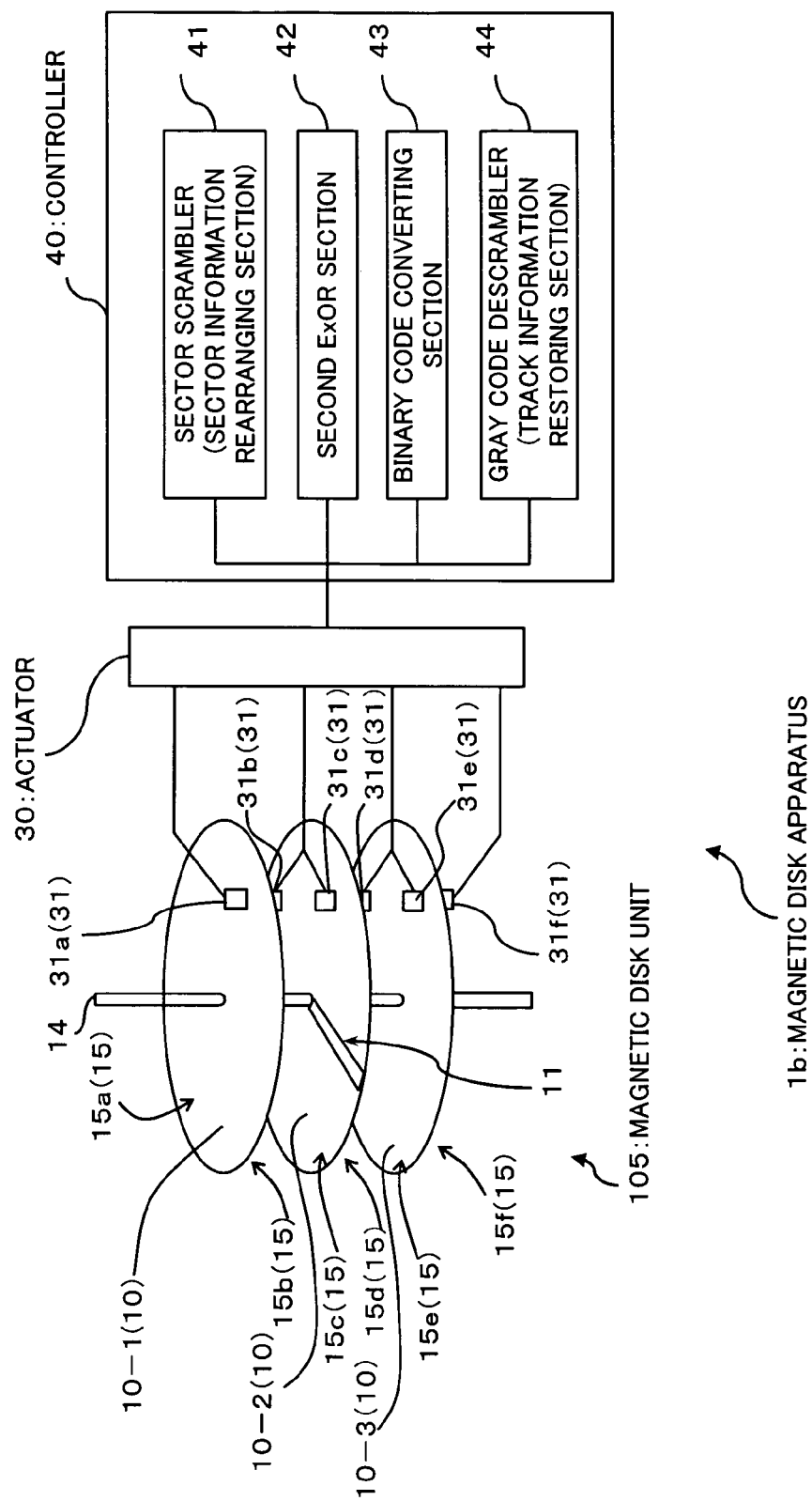
FIG. 11 is a block diagram schematically showing a configuration of a magnetic disk apparatus according to the second embodiment.

FIG. 10 is a block diagram schematically showing a magnetic disk producing apparatus (a servo frame recording apparatus) according to a second embodiment of the present invention; and FIG. 11 is a block diagram schematically showing a magnetic disk apparatus according to the second embodiment.

The magnetic disk producing apparatus 100b also produces a magnetic disk unit 105 that is to be incorporated in a magnetic disk apparatus 1b shown in FIG. 11. The magnetic disk unit 105 includes three magnetic disks 10-1, 10-2, 10-3 (see FIG. 2).

Parts and elements in accompanying drawings with reference numbers identical to those previously referred are identical or substantially identical parts and elements, so repetitious detailed description is omitted here.

(B-1) Description of the Magnetic Disk Producing Apparatus

The magnetic disk producing apparatus 100b of the second embodiment, as shown in FIG. 10, includes a controller 20 having a function as a gray code scrambler (a track information rearranging section) 26 in addition to the function of the magnetic disk producing apparatus 10a of the first embodiment. Parts and elements with reference numbers identical to those previously referred are identical or substantially identical parts and elements, so repetitious detailed description is omitted here.

The gray code scrambler (the track information rearranging section) 26 rearranges (scrambles) the serial bits of a gray code generated by a conversion performed by the gray code converting section 22 has performed.

Assuming that a gray code and an exclusive logical sum are respectively 8 bits, the gray code scrambler 26 carries out rearrangement with eight inputs and eight outputs.

The gray code scrambler 26 is exemplified by a circuit that realizes the following determinant (3).

$$\begin{pmatrix} \text{output 7} \\ \cdots \\ \text{output 0} \end{pmatrix} = \begin{pmatrix} GCS(7)(7) & GCS(7)(6) & \cdots & GCS(7)(0) \\ GCS(6)(7) & \cdots & & \\ \cdots & \cdots & & \\ GCS(0)(7) & \cdots & & GCS(0)(0) \end{pmatrix} \begin{pmatrix} \text{input 7} \\ \cdots \\ \text{input 0} \end{pmatrix} \quad (3)$$

Multiplications and additions in the determinant (3) are computed, respectively regarded as logical products (AND) and logical sums (OR), so that the input serial bits are rearranged to convert into the output serial bits in the above order.

Further, the below determinant (4) is an example to realize the gray code scrambler 26 of the magnetic disk producing apparatus 100b of the second embodiment.

$$\begin{pmatrix} \text{Bit 7} \\ \text{Bit 6} \\ \text{Bit 5} \\ \text{Bit 4} \\ \text{Bit 3} \\ \text{Bit 2} \\ \text{Bit 1} \\ \text{Bit 0} \end{pmatrix} = \begin{pmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 1 & 0 & 0 \\ 0 & 0 & 1 & 0 & 0 & 0 & 0 & 0 \\ 0 & 1 & 0 & 0 & 0 & 0 & 0 & 0 \end{pmatrix} \begin{pmatrix} G7 \\ G6 \\ G5 \\ G4 \\ G3 \\ G2 \\ G1 \\ G0 \end{pmatrix} \quad (4)$$

The example determinant (4) rearranges (scrambles) serial bits G7, G6, G5, ..., G0 of a 8-bit gray code into G7, G5, G3, G1, G0, G2, G4, G6.

Serial bits of a general gray code is recorded in an order more weighed (i.e., smaller in change) likewise G7, G6, G5, G4, G3, G2, G1, G0. Such a recording order tends to be a cause of reading errors in a seeking operation. As a solution, scrambling a gray code using, for example, the determinant (4) reduces the possibility of occurrence of reading errors when a seeking operation is being carried out.

By way of example, the gray code scrambler 26 uses the determinant (4), with the result that a gray code "5AH (01011010 in binary digit) is converted into 00110011 (33H in hexadecimal digit):
01011010→00110011

Similar to the sector scrambler 21, the gray code scrambler 26 may be formed by an electronic circuit able to rearrange serial bits in the above manner or may be realized by a processor executing a program arithmetic operation.

The first ExOR section 23 performs an exclusive OR (ExOR) on a sector number rearranged by the sector scrambler 21 and a gray code rearranged by the gray code scrambler 26 to generate an exclusive logical sum serving as combined data.

For example, a processor or the like that controls various processes performed in the magnetic disk producing apparatus 100b executes programs previously stored in a ROM or another storage whereby the above functions of the controller 20 are realized.

A succession of procedural steps (steps A10, A20, A21, A30 to A60) of writing a sector number and a cylinder number into a servo frame 11 performed in the magnetic disk producing apparatus 100b is explained with reference to flow diagram FIG. 12.

First of all, the magnetic disk producing apparatus 100b obtains a cylinder number (step A10), and the gray code converting section 22 converts the binary data of the obtained cylinder number into a gray code (step A20). The gray code scrambler 26 rearranges the generated gray code (step A21; a step of rearranging track information). Further, the magnetic disk producing apparatus 100b obtains an STW sector number (step A30), the serial bits of which is subsequently rearranged by the sector scrambler 21 (step A40; a step of rearranging sector information).

Then the first ExOR section 23 performs the ExOR on the gray code and the sector number that have been rearranged to obtain an exclusive logical sum (step A50; a step of performing the first ExOR) whereby to-be recorded data (combined data) that is to be written into a servo frame 11 is generated (step A60). Finally, the combined data is written into the servo frame 11, the position on the corresponding magnetic disk 10 of which has been determined by the position fixing section 25, by a magnetic head 51 (a step of writing).

(B-2) Description of the Magnetic Disk Apparatus

Similar to the magnetic disk apparatus 1a of the first embodiment, the magnetic disk apparatus 1b includes a magnetic disk unit 105 having a number of magnetic disks 10 (in the illustrated example shown in FIG. 11, three magnetic disks 10-1, 10-2, 10-3) produced by the magnetic disk producing apparatus 100b, and selects an arbitrary one of the magnetic disks 10-1, 10-2, 10-3 to write various data into and read various data from the selected magnetic disk.

For example, the magnetic disk apparatus 1b is also used as a storage device for a computer system to send data read from a magnetic disk 10 to a computer and record data sent from the computer into a magnetic disk 10.

The magnetic disk apparatus 1b further has a function for a gray code descrambler (a track information restoring section) 44 in the controller 40 in addition to the sections included in the controller 40 of the magnetic disk apparatus 1a, and the remaining sections or the like are same as the magnetic disk apparatus 1a of the first embodiment. Parts and elements with reference numbers identical to those previously referred are identical or substantially identical parts and elements, so repetitious detailed description is omitted here.

In the second embodiment, the binary code converting section 43 performs the ExOR on combined data obtained by a magnetic head 31 and sector information rearranged by the sector scrambler 41 for the purpose of obtaining (generating, restoring) a gray code (track information) rearranged by the gray code scrambler 26.

The gray code descrambler (track information restoring section) 44 rearranges the serial bits of a gray code obtained by the second ExOR section 42, which serial bits have been scrambled, in order to restore (descrambles, cancel scrambling) the gray code to the original state prior to the scrambling.

If a gray code and an exclusive logical sum are assumed to be respectively 8-bit digits, the gray code descrambler 44 carries out rearrangement with eight inputs and eight outputs.

For example, the gray code descrambler 44 may be realized by a circuit that computes the below determinant (5).

$$\begin{pmatrix} \text{output 7} \\ \cdots \\ \text{output 0} \end{pmatrix} = \qquad (5)$$

$$\begin{pmatrix} GCDS(7)(7) & GCDS(7)(6) & \cdots & GCDS(7)(0) \\ GCDS(6)(7) & & \cdots & \\ & \cdots & \cdots & \\ GCDS(0)(7) & & \cdots & GCDS(0)(0) \end{pmatrix} \begin{pmatrix} \text{input 7} \\ \cdots \\ \text{input 0} \end{pmatrix}$$

Multiplications and additions in the determinant (5) are computed, respectively regarded as logical products (AND) and logical sums (OR), so that the input serial bits are rearranged to convert into the output serial bits in the above order.

The below determinant (6) is an example of a determinant that realizes the gray code descrambler 44 of the magnetic disk apparatus 1b.

$$\begin{pmatrix} G7 \\ G6 \\ G5 \\ G4 \\ G3 \\ G2 \\ G1 \\ G0 \end{pmatrix} = \begin{pmatrix} 1 & 0 & 0 & 0 & 0 & 0 & 0 & 0 \\ 0 & 0 & 0 & 0 & 0 & 0 & 0 & 1 \\ 0 & 1 & 0 & 0 & 0 & 0 & 0 & 0 \\ 0 & 0 & 0 & 0 & 0 & 0 & 1 & 0 \\ 0 & 0 & 1 & 0 & 0 & 0 & 0 & 0 \\ 0 & 0 & 0 & 0 & 0 & 1 & 0 & 0 \\ 0 & 0 & 0 & 1 & 0 & 0 & 0 & 0 \\ 0 & 0 & 0 & 0 & 1 & 0 & 0 & 0 \end{pmatrix} \begin{pmatrix} \text{Bit 7} \\ \text{Bit 6} \\ \text{Bit 5} \\ \text{Bit 4} \\ \text{Bit 3} \\ \text{Bit 2} \\ \text{Bit 1} \\ \text{Bit 0} \end{pmatrix} \quad (6)$$

Computing the example determinant (6) cancels scrambling which the determinant (4) has performed on a gray code.

If the determinant (6) is adopted, an example gray code "33H (0010011 in binary digit) is restored to "01011010 (5HA in hexadecimal digit) by the gray code descrambler 44:
0010011→01011010 (5HA in hexadecimal digit)

The binary code converting section 43 converts the gray code descrambled by the gray code descrambler 44 into binary digit.

The function of the controller 40 is realized by, for example, execution of programs previously stored in a ROM or another storage by a processor that controls various processes performed in the magnetic disk apparatus 1b.

Description will now be made in relation to a succession of procedural steps (steps B10-B40, B41, B50 and B60) of reading a cylinder number from a servo frame 11 performed in the magnetic disk apparatus 1b with reference to flow diagram FIG. 13.

To begin with, the magnetic disk apparatus 1b reads combined data from a servo frame 11 (step B10; a step of obtaining combined data) and also obtains an STW sector number (step B20), the serial bit of which are then rearranged by the sector scrambler 41 (step B30; a step of rearranging sector information). In succession, the second ExOR section 42 performs the ExOR on the read combined data and the rearranged sector number, so that a gray code that has been rearranged by the gray code scrambler 26 is generated (restored) (step B40; a step of performing second ExOR).

After that, the gray code descrambler 44 descrambles the gray code generated by the second ExOR section 42 (step B41; a step of restoring track information), and the binary code converting section 43 converts the restored gray code into binary data (step B50), so that a cylinder number is generated and obtained (step B60).

From the features mentioned above, the magnetic disk producing apparatus 100b and the magnetic disk apparatus 1b of the second embodiment ensure advantages identical to those obtained from the fist embodiment and further can eliminate occurrence of reading errors during seeking because of scrambling performed over a gray code.

Figure 12:
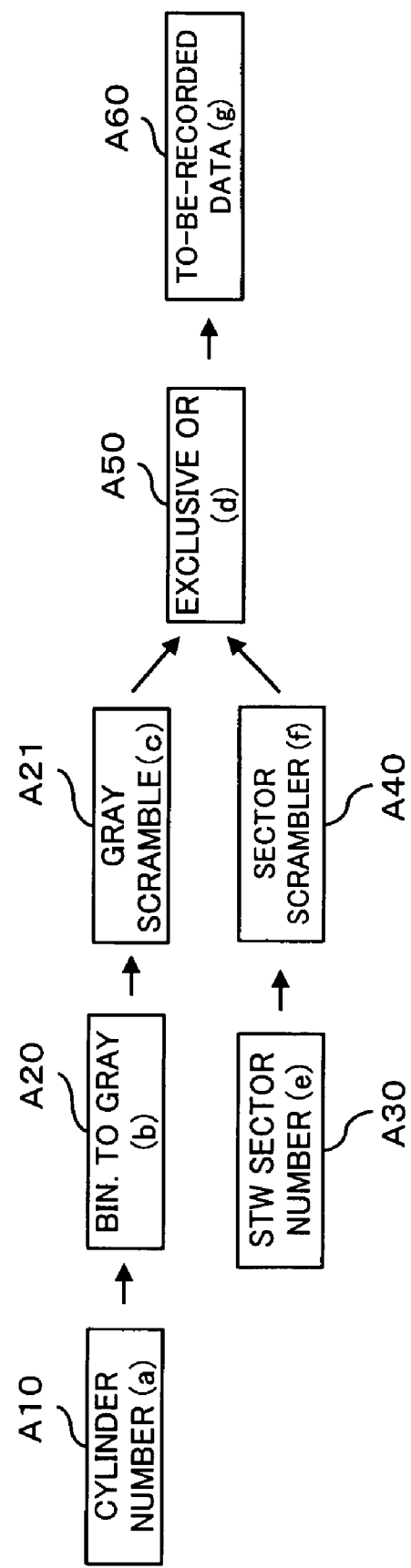
FIG. 12 is a flow diagram showing a succession of procedural steps of writing a sector number and a cylinder number into a servo frame by the magnetic disk producing apparatus of FIG. 10.
Figure 13:
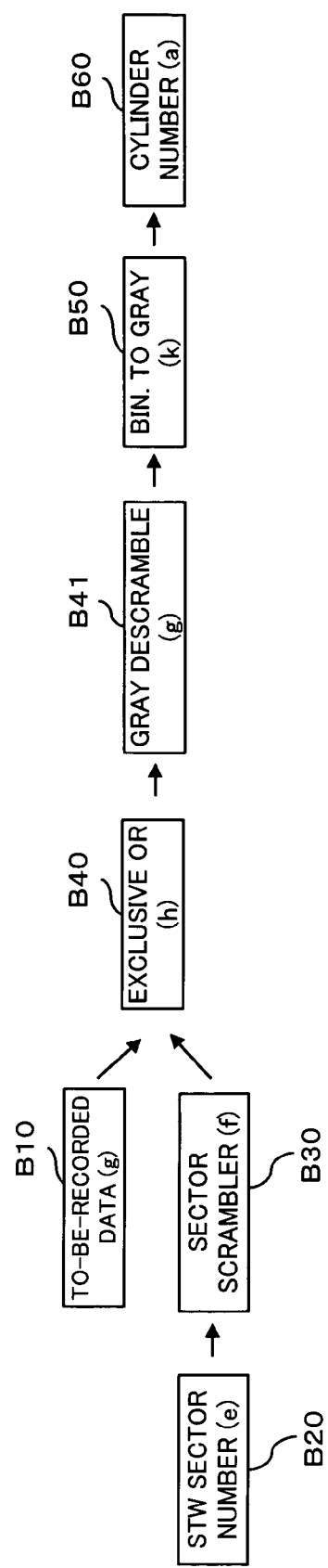
FIG. 13 is a flow diagram showing a succession of procedural steps of reading a cylinder number from a servo frame by a magnetic disk apparatus of FIG. 11.
Figure 15A:
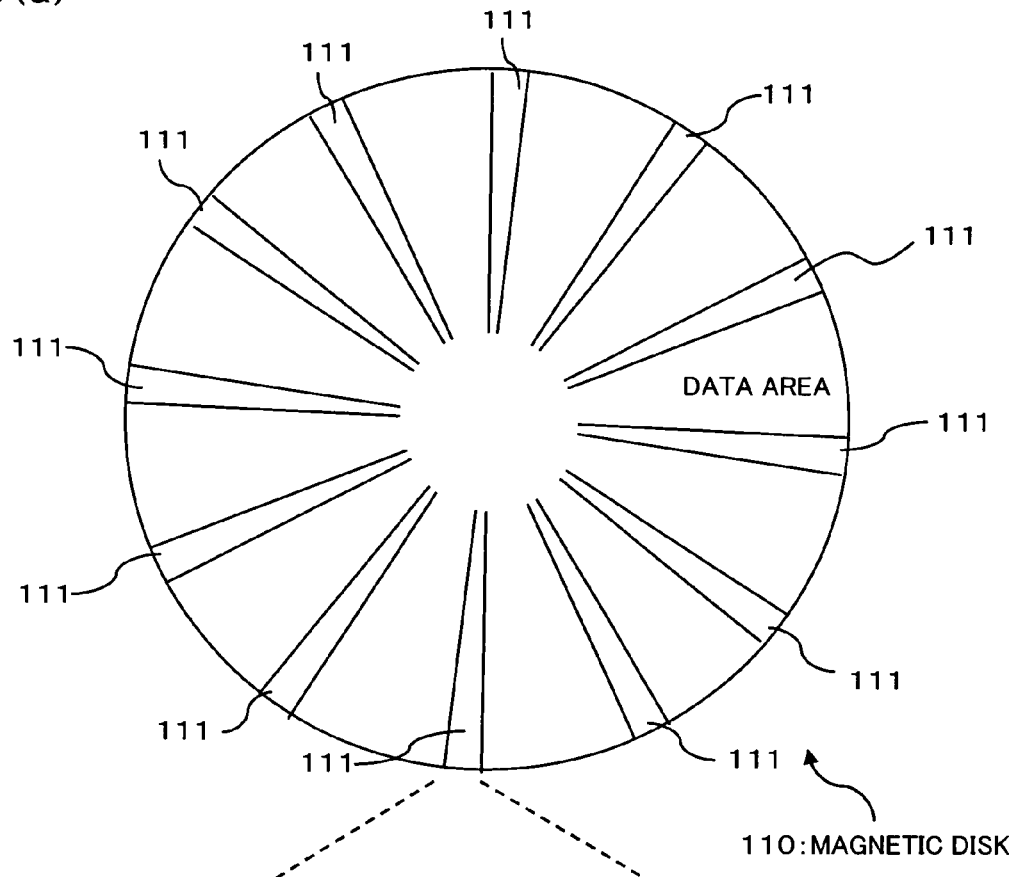
FIGS. 15(a) and 15(b) are diagram showing a configuration of a conventional magnetic disk.
Figure 15B:
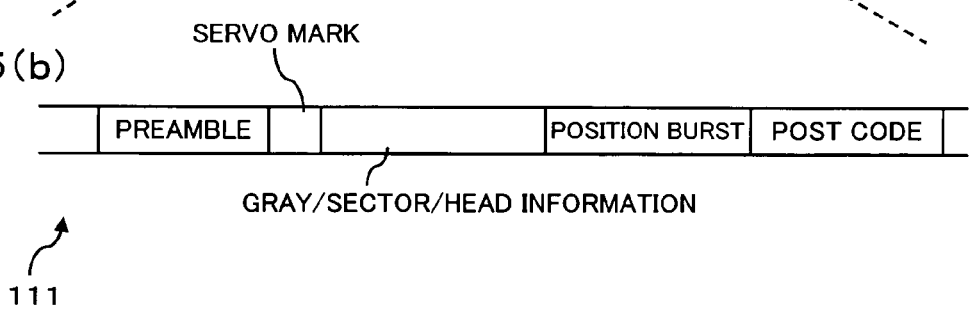

FIG. 14 shows examples of digits generated in steps of flow diagrams FIGS. 12 and 13. Symbols (a), (b), (c), (d), (e), (f), (g), (h), (k) in FIG. 9 respectively show hexadecimal digits generated in steps attaches symbols (a), (b), (c), (d), (e), (f), (g), (h), (k) in FIGS. 12 and 13.

(C) Others

Further, the present invention should by no means be limited to these foregoing embodiments, and various changes or modifications may be suggested without departing from the gist of the invention.

For example, in the first and the second embodiments explained above, the sector scramblers 21, 41, the gray code scrambler 26 and the gray code descrambler 44 carry out rearrangement with eight inputs and eight outputs but the rearrangement should by no means be limited to eight inputs and eight outputs.

The below determinant (7) is an example of a modification of a sector scrambler that carries out rearrangement with eight inputs and 32 outputs.

$$\begin{pmatrix} \text{output 31} \\ \text{output 30} \\ \text{output 29} \\ \text{output 28} \\ \text{output 27} \\ \text{output 26} \\ \text{output 25} \\ \text{output 24} \\ \text{output 23} \\ \text{output 22} \\ \text{output 21} \\ \text{output 20} \\ \text{output 19} \\ \text{output 18} \\ \text{output 17} \\ \text{output 16} \\ \text{output 15} \\ \text{output 14} \\ \text{output 13} \\ \text{output 12} \\ \text{output 11} \\ \text{output 10} \\ \text{output 9} \\ \text{output 8} \\ \text{output 7} \\ \text{output 6} \\ \text{output 5} \\ \text{output 4} \\ \text{output 3} \\ \text{output 2} \\ \text{output 1} \\ \text{output 0} \end{pmatrix} = \begin{pmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \end{pmatrix} \begin{pmatrix} \text{input 7} \\ \text{input 6} \\ \text{input 5} \\ \text{input 4} \\ \text{input 3} \\ \text{input 2} \\ \text{input 1} \\ \text{input 0} \end{pmatrix} \quad (7)$$

Use of such a determinant can adjust the number of output bits generated on the basis of input serial bits. Various determinants having desired number of inputs and outputs can be used in consideration of matching with the specification of each magnetic disk 10.

The present invention can be applied to any disk-type storage, other than a magnetic disk, on which a servo frame is formed.

What is claimed is:

1. A method for recording sector information and track information into a servo frame on a storage disk, comprising the steps of:
   (a) inverting serial bits of the sector information that is binary data;
   (b) generating the track information by converting a cylinder number in the form of binary data into a gray code as a result of performing an exclusive OR (ExOR);
   (c) obtaining an exclusive logical sum of the sector information, the serial bits of which have been inverted in said step (a) of inverting, and the track information generated in said step of (b); and
   (d) writing the exclusive logical sum obtained in said step (b) of obtaining into the servo frame.

2. A method according to claim 1 further comprising the step of (e) rearranging serial bits of the track information that is binary data,
   said step (c) of obtaining obtains the exclusive logical sum using the sector information, the serial bits of which have been inverted in said step (a) of inverting, and the track information, the serial bits of which have been rearranged in said step (e) of rearranging.

3. An apparatus for recording sector information and track information into a servo frame on a storage disk, comprising:
   a sector information inverting section for inverting serial bits of the sector information that is binary data;
   a gray code converting section for generating the track information by converting a cylinder number in the form of binary data into a gray code as a result of performing an exclusive OR (ExOR);
   an ExOR section for performing an ExOR (exclusive OR) on the sector information, the serial bits of which have been inverted by said sector information inverting section, and the track information generated by said gray code converting section, so that an exclusive logical sum is obtained; and
   a writing section for writing the exclusive logical sum obtained by said ExOR section into the servo frame.

4. An apparatus according to claim 3, further comprising a track information rearranging section for rearranging serial bits of the track information that is binary data,
   said ExOR section performing the ExOR on the sector information, the serial bits of which have been inverted by said sector information inverting section, and the track information, the serial bits of which have been rearranged by said track information rearranging section.

5. A storage disk on which sector information and track information is recorded into a servo frame formed on the disk, wherein
   an exclusive logical sum of the sector information that is serial binary data which has been inverted and the track information that is generated by converting a cylinder number in the form of binary data into a gray code as a result of performing an exclusive OR (ExOR) is recorded in the servo frame.

6. A storage disk according to claim 5, wherein the track information that is serial binary data is rearranged and is recorded in the form of the exclusive logical sum obtained in conjunction with the sector information that has been inverted into the servo frame.

7. A method for obtaining servo frame information serving as combined data generated by combining sector information and track information from a storage disk on which the combined data is recorded into a servo frame formed on the disk, comprising the steps of:
   (a) obtaining the combined data from the servo frame;
   (b) inverting serial bits of the sector information that is binary data; and
   (c) performing an ExOR on the combined data obtained in said step (a) of obtaining and the sector information, the serial bits of which have been inverted in said step (b) of inverting, in order to generate a gray code, and converting the gray code into a cylinder number in the form of binary data that is to be used as the track data.

8. A method according to claim 7 further comprising the step of (d) rearranging serial bits of the track information that is binary data, which track information has been generated in said step (c) of performing, to restore the track information.

9. An apparatus for obtaining servo frame information serving as combined data generated by combining sector information and track information from a storage disk on which the combined data is recorded into a servo frame formed on the disk, comprising:
   a combined data obtaining section for obtaining the combined data from the servo frame;
   a sector information inverting section for inverting serial bits of the sector information that is binary data; and
   an ExOR section for performing an ExOR on the combined data obtained by said combined data obtaining section and the sector information, the serial bits of which have been inverted by said sector information inverting section, so that a gray code is generated, and converting the gray code into a cylinder number in the form of binary data that is used as the track information.

10. An apparatus according to claim 9 further comprising a track information restoring section for restoring the track information by rearranging serial bits of the track information that is binary data which track information has been obtained by said ExOR section.

* * * * *